(12) United States Patent
Ericson et al.

(10) Patent No.: US 12,263,825 B1
(45) Date of Patent: Apr. 1, 2025

(54) SYSTEM AND METHOD FOR TRANSMISSION CLUTCH SUPPORT ON HYBRID ELECTRIC VEHICLE

(71) Applicant: FCA US LLC, Auburn Hills, MI (US)

(72) Inventors: Michael Ericson, Chesterfield Township, MI (US); Zachary C Rogalski, Rochester Hills, MI (US); James R Hollowell, Brownstown, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/428,167

(22) Filed: Jan. 31, 2024

(51) Int. Cl.
*B60W 10/02* (2006.01)
*B60W 20/40* (2016.01)

(52) U.S. Cl.
CPC ............ *B60W 10/02* (2013.01); *B60W 20/40* (2013.01); *B60W 2710/083* (2013.01)

(58) Field of Classification Search
CPC . B60W 10/02; B60W 20/40; B60W 2710/083
See application file for complete search history.

(56) References Cited

U.S. PATENT DOCUMENTS

| 2015/0031504 A1* | 1/2015 | Reynolds | B60W 30/18027 477/93 |
|---|---|---|---|
| 2018/0134276 A1* | 5/2018 | Zhao | B60L 58/12 |
| 2019/0152480 A1* | 5/2019 | Smyczynski | B60W 20/15 |
| 2019/0168731 A1* | 6/2019 | Lee | B60W 20/20 |

FOREIGN PATENT DOCUMENTS

| CN | 203681535 U | * | 7/2014 | ............. B60W 20/00 |
| DE | 102008064266 A1 | * | 6/2010 | ............. B60K 6/485 |

* cited by examiner

*Primary Examiner* — Tisha D Lewis
(74) *Attorney, Agent, or Firm* — Jeremy J. Klobucar

(57) ABSTRACT

A vehicle system for a hybrid electric vehicle that implements a transmission clutch support mode during a stop of the vehicle includes a hybrid powertrain, a brake system, a clutch and a controller. The hybrid powertrain includes an internal combustion engine and an electric motor that provides motor torque to a driveline for propelling the vehicle. The brake system selectively provides brake torque to drive wheels based on application of a brake pedal. The clutch opens and closes to engage the powertrain with the driveline. The controller initiates clutch support mode and determines whether a brake pedal release has been detected; commands a brake hold that maintains brake pressure of the brake system subsequent to detection of the brake pedal release; and commands the clutch to move to an engaged position while cancelling the brake hold resulting in concurrent blend-out of the brake torque and blend-in of the motor torque.

10 Claims, 4 Drawing Sheets

SYSTEM AND METHOD FOR TRANSMISSION CLUTCH SUPPORT ON HYBRID ELECTRIC VEHICLE

FIELD

The present disclosure relates generally to a system and method for providing transmission clutch support during brake release on a hybrid electric vehicle.

BACKGROUND

An electrified vehicle (hybrid electric (HEV), plug-in hybrid electric (PHEV), mild hybrid electric (MHEV) etc.) includes at least one battery system and at least one electronic drive module having an electric motor and associated electric drive gearbox assembly. Typically, the electrified vehicle includes a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor. In hybrid powertrain configurations, an internal combustion engine (ICE) and one or more electric motors cooperate with a transmission to deliver drive torque through a driveline to the drive wheels. A controller, such as a transmission controller, manages the delivery of the torque between the electric motor(s) and the ICE depending upon drive modes, drive conditions and other factors. A clutch is used to selectively disengage the drive torque and the driveline based on signals from the transmission controller. In some driving conditions with such hybrid powertrains a driver can experience different vehicle behavior, such as vehicle rollback, when releasing the brake pedal. In this regard, while hybrid powertrains do work well for their intended purpose, there remains a desire for improvement in the relevant art.

SUMMARY

In one example aspect of the invention, a vehicle system for a hybrid electric vehicle that implements a transmission clutch support mode during a stop of the vehicle includes a hybrid powertrain, a brake system, a clutch and a controller. The hybrid powertrain includes an internal combustion engine (ICE) and at least one electric motor that provides motor torque to a driveline of the vehicle including drive wheels for propelling the vehicle. The brake system selectively provides brake torque to the drive wheels based on application of a brake pedal. The clutch selectively opens and closes to engage the powertrain with the driveline. The controller initiates the clutch support mode. The controller determines whether a brake pedal release has been detected; commands a brake hold that maintains brake pressure of the brake system subsequent to detection of the brake pedal release; and commands the clutch to move from a disengaged position to an engaged position while cancelling the brake hold resulting in concurrent blend-out of the brake torque and blend-in of the motor torque.

In another aspect, the drive wheels are inhibited from rollback during the clutch support mode.

In some implementations, the controller comprises a transmission control unit.

In some configurations, brake torque increases while motor torque decreases during application of the brake pedal.

In additional implementations, brake torque decreases and motor torque increases during movement of the clutch to the engaged position.

In examples, the clutch is an ILE clutch.

In one example aspect of the invention, a method for implementing a clutch support mode during a vehicle stop on a hybrid electric vehicle is provided. The hybrid electric vehicle includes a hybrid powertrain, a brake system and a clutch, the hybrid powertrain having an internal combustion engine (ICE) and at least one electric motor that provides motor torque to a driveline of the vehicle, the driveline including drive wheels for propelling the vehicle, the brake system selectively providing brake torque to the drive wheels based on application of a brake pedal, wherein the clutch selectively opens and closes to engage the powertrain with the driveline. The method includes determining, at a controller, whether a brake pedal release has been detected; commanding, at the controller, a brake hold that maintains brake pressure of the brake system subsequent to detection of the brake pedal release; and commanding, at the controller, the clutch to move from a disengaged position to an engaged position while cancelling the brake hold resulting in concurrent blend-out of the brake torque and blend-in of the motor torque.

In another aspect of the disclosed method, the drive wheels are inhibited from rollback during the clutch support mode.

In some implementations of the disclosed method, the controller comprises a transmission control unit.

In some configurations of the disclosed method, brake torque increases while motor torque decreases during application of the brake pedal.

In additional implementations of the disclosed method, brake torque decreases and motor torque increases during movement of the clutch to the engaged position.

In examples of the disclosed method, the clutch is an ILE clutch.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As discussed above, in hybrid powertrain configurations an internal combustion engine (ICE) and one or more electric motors cooperate with a transmission to deliver drive torque through a driveline to the drive wheels. A controller, such as a transmission controller, manages the delivery of the torque between the electric motor(s) and the ICE depending upon drive modes, drive conditions and other factors. A clutch is used to selectively disengage the drive torque and the driveline based on signals from the transmission controller. In some instances, in such hybrid powertrains a driver can experience different vehicle behavior, such as vehicle rollback, when releasing the brake pedal.

In some PHEV's or MHEV's having a P1/P2 powertrain architecture, a virtual launch clutch (ILE) is used to selectively engage the powertrain with the driveline. In a P1/P2 architecture, the transmission controller can disengage the ILE clutch when the driver presses the brake pedal at standstill. An exemplary P1/P2 architecture can include an engine starting motor (P1) or belt starter generator (BSG), connected to the engine via a belt system as well as an electric traction motor (P2) used to deliver torque to the drive wheels. In prior art systems, when the ILE clutch is disengaged, the propulsion system is decoupled from the driveline and the wheels. When the brake pedal is subsequently released, the transmission controller cannot engage the ILE clutch fast enough to provide immediate idle torque to the drive wheels. If the vehicle is on a grade, this issue can cause a brief rollback of the vehicle.

The instant disclosure provides a system and method that inhibits unintended and unpredictable vehicle rollback when a driver lifts the brake pedal on an uphill grade while the ILE clutch is still engaging. The system and method of the present disclosure implements an extended brake hold when the brake pedal is released. The extended brake hold is smoothly ramped out while the ILE clutch is smoothly engaged and capable of delivering desired idle creep torque to the driveline and drive wheels. The techniques described herein align the extended brake hold request with a disengaging ILE clutch. The instant disclosure matches performance of conventional powertrains (ICE only with torque converter) in which idle creep torque is immediately available at the wheels when the brake pedal is released. The instant disclosure eliminates unexpected vehicle rollback after the brake pedal is released on an uphill grade.

Figure 1:
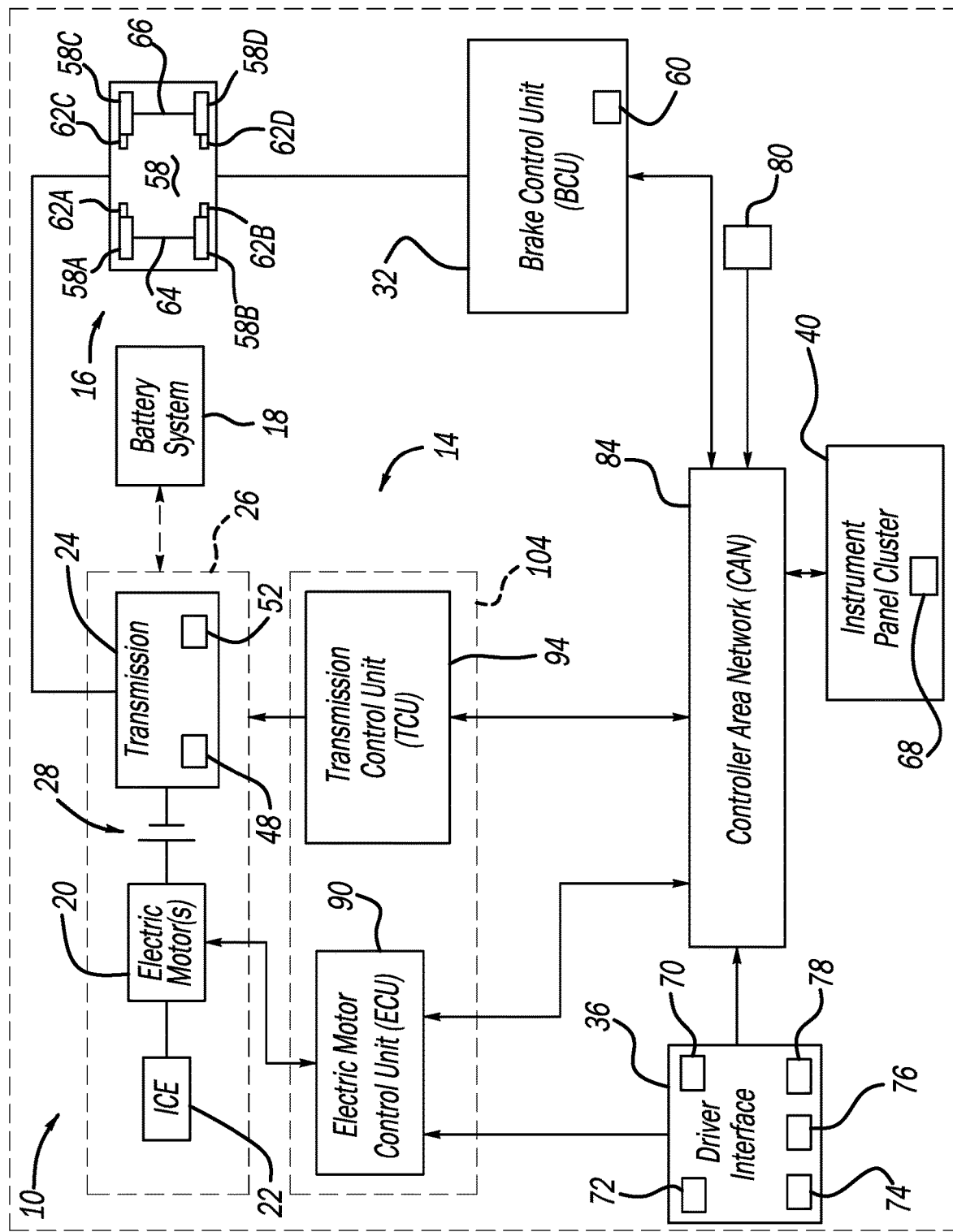
FIG. 1 is a schematic block diagram of an exemplary vehicle system according to the principles of the present disclosure.

With initial reference to FIG. 1, an exemplary vehicle system is schematically shown and generally identified at reference numeral 10. The exemplary vehicle system 10 is associated with an exemplary electrified vehicle 12 and includes an electrified powertrain 14 configured to transfer drive torque to a driveline 16 of the vehicle 14 for propulsion. The electrified powertrain 14 is a hybrid powertrain and generally comprises a high voltage battery system 18, one or more electric motors 20, an internal combustion engine (ICE) 22, and a transmission 24. The one or more electric motors 20, ICE 22 and the transmission 24 can be collectively referred to herein as a hybrid powertrain 26. A clutch 28 selectively opens and closes to engage the powertrain 26 with the driveline 16. The clutch 28 is referred to herein as a virtual launch clutch (ILE). While the clutch 28 is generally illustrated in the powertrain 26 between the electric motor 20 and the transmission 24, the clutch 28 can be positioned elsewhere such as intermediate the P2 motor 20 and the ICE 22.

The vehicle system 10 further includes a brake control unit (BCU) 32 that can control function of the brakes (foundation, anti-lock, etc.). While shown together it will be appreciated that the vehicle system 10 can have a dedicated traction control system that operates independent of an anti-lock brake system. The vehicle system 10 further includes a driver interface 36 and an instrument panel or cluster 40. The instrument panel or cluster 40 can include any interface device, such as a driver information center and/or vehicle infotainment system capable of receiving input from a driver.

The transmission 24 includes various transmission speed sensors, such as input and output transmission shaft speed sensors 48 and various shift sensors 52, to provide a signal to an associated control system indicative of a transmission gear selected. In the exemplary vehicle system, all of the wheels 58 are drive wheels that receive torque input. The wheels 58 are identified individually as front wheels 58A, 58B and rear wheels 58O, 58D. The wheels 58A, 58B, 58C and 58D each have wheel speed sensors 62A, 62B, 62C and 62D. In the example shown, the front wheels 58A and 58B are selectively coupled by a front axle 64. Similarly, the rear wheels 58C and 58D are selectively coupled by a rear axle 66. In the exemplary implementation illustrated, the BCU 32 is controlled to activate foundation brakes 60.

The driver interface 36 includes a steering wheel 70 and a brake pedal 72. The driver interface 36 includes a driver input device, e.g., an accelerator pedal 74, for providing a driver input, e.g., a torque request, for the motor 20. The driver interface 36 can further include a park brake 76. The driver interface 36 or vehicle interior also includes a transmission shift request device, such as a shift lever or rotary shifter 78, for the driver to request a desired gear of the transmission 24. The shift lever or rotary shifter 78 can provide conventional transmission options including park, reverse, neutral, drive and low. The vehicle system 10 also includes sensors 80. The sensors 80 can include longitudinal sensor or other equivalent sensor for providing data indicative of whether or not the vehicle 12 is on a grade and the incline or angle of the grade.

One or more controllers are utilized to control the various vehicle components or system discussed above. In one exemplary implementation, various individual controllers are utilized to control the various components/systems discussed herein and are in communication with each other and/or the various components/systems via a local interface 84. In this exemplary implementation, the local interface 84 is one or more buses or other wired or wireless connections, as is known in the art. In the example illustrated in FIG. 1, the local interface 84 is a controller area network (CAN). The CAN 84 may include additional elements or features, which have been omitted for simplicity, such as controllers, buffers (cache) drivers, repeaters and receivers, among many others, to enable communications. Further, the CAN 84 may include address, control and/or data connections to enable appropriate communications among the components/systems described herein.

In the example illustrated in FIG. 1, the vehicle system 10 includes an electric motor control unit (ECU) 90 for controlling the motor 20, and a transmission control unit (TCU) 94 for controlling the transmission 24. Both of the control units 90 and 94 as well as the BCU 32, driver interface 36, instrument cluster 40 and sensor 80 are in communication with CAN 84 and thus each other. It will be appreciated that while individual control units are discussed herein and shown in various Figures, the individual control units may also be optionally implemented in the form of one control unit, such as a powertrain or vehicle control unit, represented by broken line 104 in FIG. 1. Thus, it will be appreciated that while the discussion will continue with reference to the individual controllers discussed above, the discussion is equally applicable to the components of vehicle system 10 being controlled by one controller.

Figure 2:
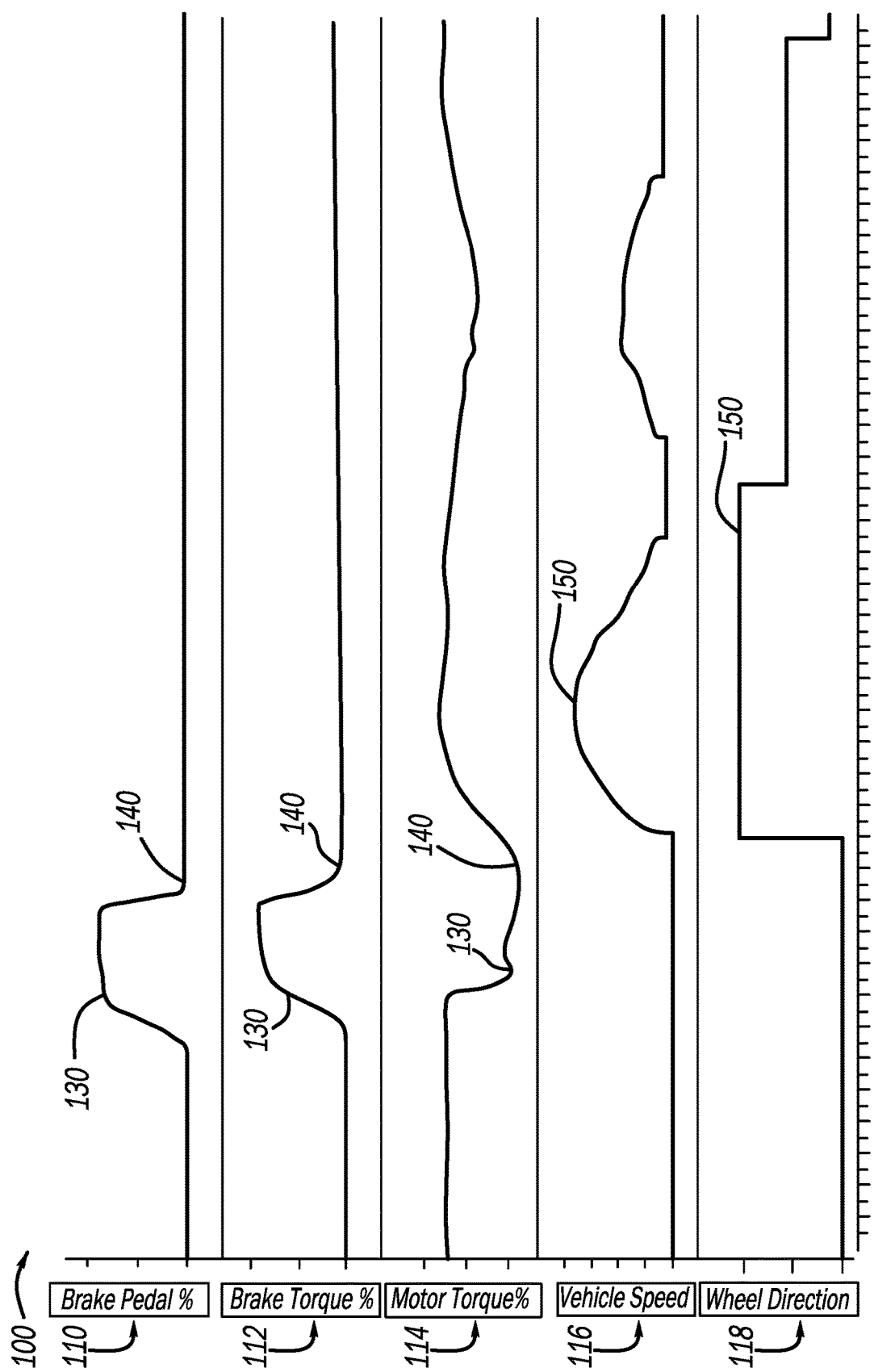
FIG. 2 illustrates brake pedal, brake torque, motor torque, vehicle speed and wheel direction traces during a stop and subsequent brake pedal release event according to Prior Art.

Referring now to FIG. 2, vehicle system traces 100 including a brake pedal trace 110, a brake torque trace 112, a motor torque trace 114, a vehicle speed trace 116, and a wheel direction trace 118 during a stop and subsequent brake pedal release event according to one Prior Art example are shown. At the start of the event, idle creep torque is holding the vehicle 10 at a standstill on an uphill grade (no input from the brake pedal 72 or the accelerator pedal 74). The brake pedal 72 is applied generally identified at 130 and brake torque increases. The transmission controller 94 decides to disengage the ILE clutch 26 and idle creep torque (motor torque) reduces (due to the powertrain 26 being disconnected from the driveline 16). The brake pedal 72 is subsequently released, generally at 140 and brake torque reduces to zero. The ILE clutch 28 is still disengaged and idle creep torque (motor torque) remains low. Such a condition can result in rollback of the vehicle 10, identified at 150. The ILE clutch 28 re-engages and idle creep toque is eventually increased to a point where the vehicle 10 slows to a stop, and in some cases rolls forward again. This vehicle rollback in prior art arrangements, shown at 150 is undesirable.

The present disclosure introduces a new external brake hold request from the TCU 94 to the BCU 32. This allows the TCU 94 to request an extended brake hold while the ILE clutch 28 disengages. The TCU subsequently cancels the brake hold request while the ILE clutch 28 engages. As a result, the vehicle 10 remains at standstill through the duration of the brake apply/release sequence, matching the behavior of a conventional ICE powertrain.

Figure 3:
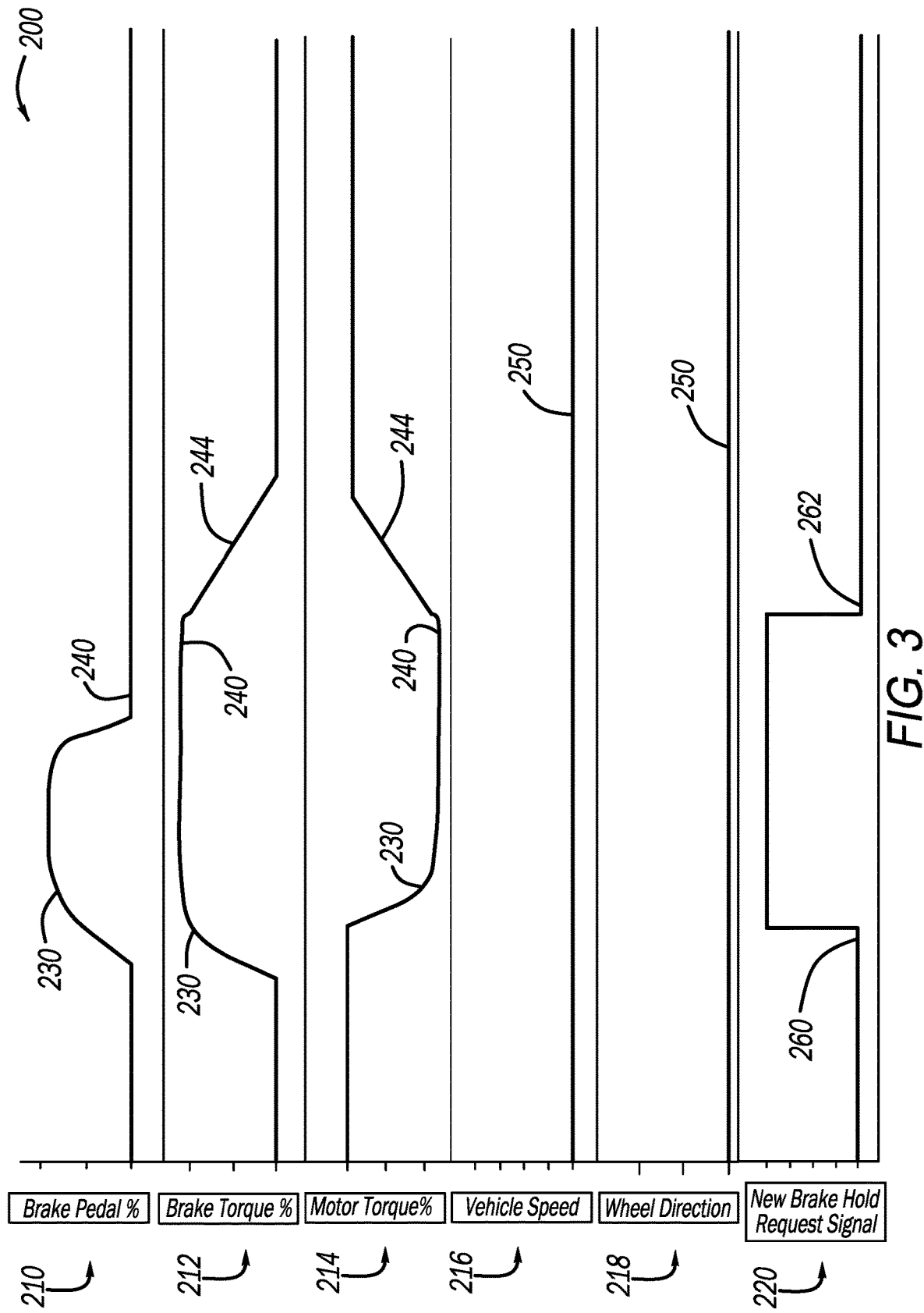
FIG. 3 illustrates brake pedal, brake torque, motor torque, vehicle speed, wheel direction and brake hold request signal traces during a stop and subsequent brake pedal release event according to examples of the present disclosure.

Referring now to FIG. 3, vehicle system traces 200 including a brake pedal trace 210, a brake torque (or pressure) trace 212, a motor torque trace 214, a vehicle speed trace 216, a wheel direction trace 218 and a brake hold request signal 220 during a stop and subsequent brake pedal release event according to examples of the present disclosure are shown. At the start of the event, idle creep torque is holding the vehicle 10 at a standstill on an uphill grade (no input from the brake pedal 72 or the accelerator pedal 74). The brake pedal 72 is applied generally identified at 230 and brake torque increases. The TCU 94 decides to disengage the ILE clutch 26 and idle creep torque (motor torque) reduces (due to the powertrain 26 being disconnected from the driveline 16). The TCU 94 requests extended brake hold from the BCU 32, generally identified at 260. The brake pedal 72 is released, generally identified at 240, and the brake torque is held due to the TCU 94 request remaining active. The motor torque is still low as the ICE clutch 28 is still disengaged. The TCU 94 starts to engage the ILE clutch 28 and cancels brake hold request at 262. Upon cancelling of the brake hold request at 262, brake torque blends out smoothly, shown generally at 244, as idle creep torque (motor torque) blends in smoothly while engaging the ILE clutch 28. As shown in the vehicle speed trace 216 and the wheel direction trace 218, rollback of the vehicle 10 is prevented.

Figure 4:
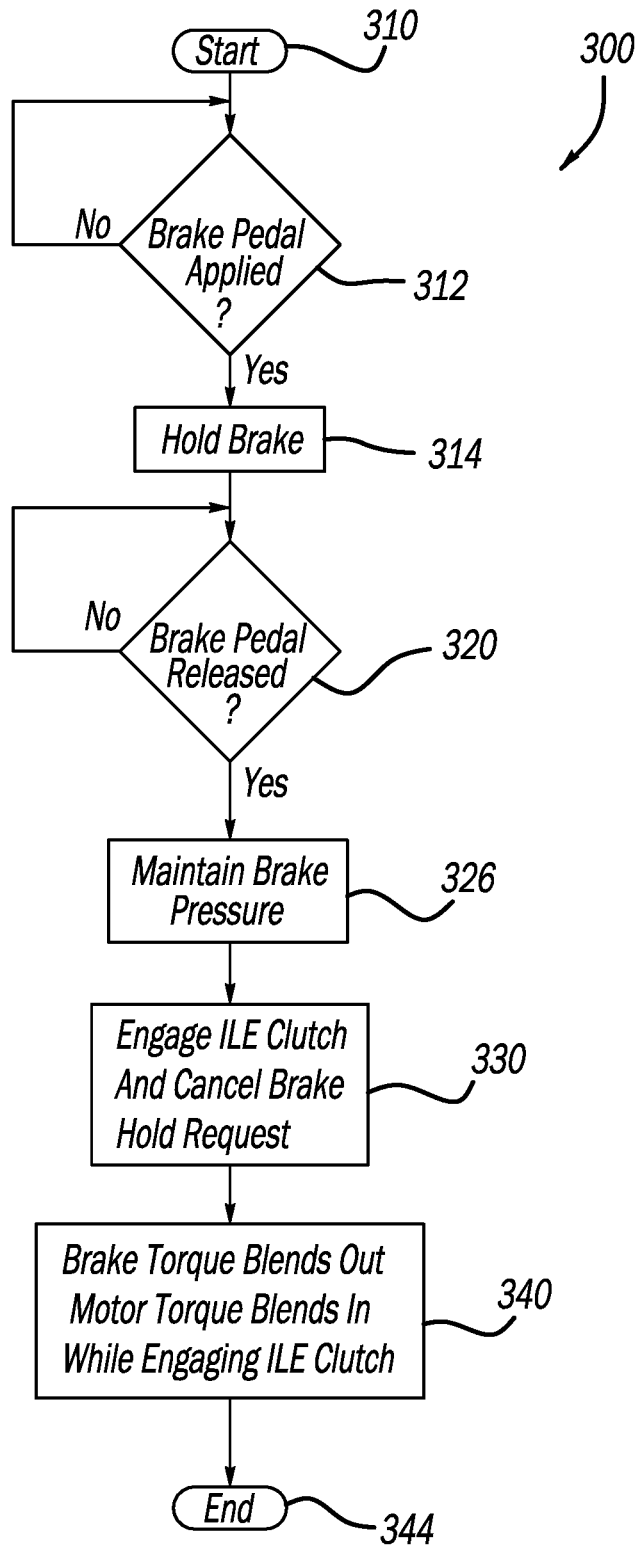
FIG. 4 is logic flow diagram illustrating an example method of operating the vehicle system of FIG. 1 during a stop and subsequent brake pedal release event according to the principles of the present disclosure.

With additional reference now to FIG. 4, a logic flow diagram illustrating an example method of operating the vehicle system of FIG. 1 in a transmission clutch support mode during a stop and subsequent brake pedal release event according to the principles of the present disclosure is shown and generally identified at reference numeral 300. The method starts at 310. At 312 control determines whether the brake pedal 72 is applied. If not, control loops to 312. If control determines that the brake pedal 72 is applied, control holds the brakes 60 at 314. At 320 control determines whether the brake pedal 72 is released. In not, control loops to 314. If control determines that the brake pedal 72 has been released, control maintains brake pressure at 326. At 330 control engages the ILE clutch 28 and cancels the brake hold request. At 340 brake torque blends out and the motor torque blends in while the ILE clutch 28 is engaged. Control ends at 344. As used herein, the term "blends out" is used to mean moving smoothly from a non-zero brake torque to a zero brake torque. Similarly, the term "blend in" is used to mean moving smoothly the ILE clutch 28 from a disengaged position to an engaged position.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle system for a hybrid electric vehicle that implements a transmission clutch support mode during a stop of the vehicle, the vehicle system comprising:
a hybrid powertrain having an internal combustion engine (ICE) and at least one electric motor that provides motor torque to a driveline of the vehicle including drive wheels for propelling the vehicle;
a brake system that selectively provides brake torque to the drive wheels based on application of a brake pedal;
a clutch that selectively opens and closes to engage the powertrain with the driveline;
a controller that initiates the clutch support mode, wherein the controller:
determines whether a brake pedal release has been detected;
commands a brake hold that maintains brake pressure of the brake system subsequent to detection of the brake pedal release; and
commands the clutch to move from a disengaged position to an engaged position while cancelling the brake hold resulting in concurrent blend-out of the brake torque and blend-in of the motor torque wherein brake torque progressively decreases and motor torque progressively increases during movement of the clutch to the engaged position.

2. The vehicle system of claim 1, wherein the drive wheels are inhibited from rollback during the clutch support mode.

3. The vehicle system of claim 2, wherein the controller comprises a transmission control unit.

4. The vehicle system of claim 1, wherein brake torque increases while motor torque decreases during application of the brake pedal.

5. The vehicle system of claim 1, wherein the clutch is a virtual launch clutch.

6. A method for implementing a clutch support mode during a vehicle stop on a hybrid electric vehicle that includes a hybrid powertrain, a brake system and a clutch, the hybrid powertrain having an internal combustion engine (ICE) and at least one electric motor that provides motor torque to a driveline of the vehicle, the driveline including drive wheels for propelling the vehicle, the brake system selectively providing brake torque to the drive wheels based on application of a brake pedal, wherein the clutch selectively opens and closes to engage the powertrain with the driveline, the method comprising:

determining, at a controller, whether a brake pedal release has been detected;

commanding, at the controller, a brake hold that maintains brake pressure of the brake system subsequent to detection of the brake pedal release; and commanding, at the controller, the clutch to move from a disengaged position to an engaged position while cancelling the brake hold resulting in concurrent blend-out of the brake torque and blend-in of the motor torque, wherein brake torque progressively decreases and motor torque progressively increases during movement of the clutch to the engaged position.

7. The method of claim 6, wherein the drive wheels are inhibited from rollback during the clutch support mode.

8. The method of claim 7, wherein the controller comprises a transmission control unit.

9. The method of claim 6, wherein brake torque increases while motor torque decreases during application of the brake pedal.

10. The method of claim 6, wherein the clutch is a virtual launch clutch.

\* \* \* \* \*